US012764299B2

(12) United States Patent
Hendry et al.

(10) Patent No.: US 12,764,299 B2
(45) Date of Patent: Oct. 13, 2026

(54) METHOD AND DEVICE FOR SIGNALING IMAGE INFORMATION

(71) Applicant: LG ELECTRONICS INC., Seoul (KR)

(72) Inventors: Hendry Hendry, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 18/946,256

(22) Filed: Nov. 13, 2024

(65) Prior Publication Data

US 2025/0071290 A1 Feb. 27, 2025

Related U.S. Application Data

(63) Continuation of application No. 17/783,572, filed as application No. PCT/KR2020/018066 on Dec. 10, 2020, now Pat. No. 12,166,996.

(60) Provisional application No. 62/947,528, filed on Dec. 12, 2019.

(51) Int. Cl.

| | |
|---|---|
| ***H04N 19/136*** | (2014.01) |
| ***H04N 19/132*** | (2014.01) |
| ***H04N 19/176*** | (2014.01) |
| ***H04N 19/46*** | (2014.01) |

(52) U.S. Cl.

CPC ......... *H04N 19/136* (2014.11); *H04N 19/132* (2014.11); *H04N 19/176* (2014.11); *H04N 19/46* (2014.11)

(58) Field of Classification Search

CPC ...... H04N 19/105; H04N 19/86; H04N 19/70; H04N 19/132; H04N 19/176; H04N 19/136; H04N 19/46

See application file for complete search history.

(56) References Cited

U.S. PATENT DOCUMENTS

2013/0188733 A1* 7/2013 Van der Auwera .... H04N 19/43 375/240.24
2014/0286396 A1* 9/2014 Lee ...................... H04N 19/196 375/240.02
2015/0195573 A1* 7/2015 Aflaki Beni ......... H04N 19/513 375/240.16
2019/0320192 A1* 10/2019 Hannuksela ............ G06F 9/328
2022/0217380 A1* 7/2022 Hendry .................. H04N 19/44

* cited by examiner

*Primary Examiner* — Neil R Mikeska
(74) *Attorney, Agent, or Firm* — Bryan Cave Leighton Paisner LLP

(57) ABSTRACT

An image decoding method performed by a decoding device according to the present disclosure comprises the steps of: obtaining prediction-related information and indication information comprising a first flag which indicates whether or not a sample adaptive offset (SAO) process to be applied to a current block is applied at a picture level or a slice level; parsing information related to the SAO process from a picture header or a slice header on the basis of the first flag; generating prediction samples for the current block on the basis of the prediction-related information; generating reconstructed samples for the current block on the basis of the prediction samples; and performing the SAO process for the reconstructed samples on the basis of the information related to the SAO process.

3 Claims, 13 Drawing Sheets

(a)

(b)

METHOD AND DEVICE FOR SIGNALING IMAGE INFORMATION

CROSS-REFERENCE TO RELATED APPLICATIONS

This application is a continuation of U.S. patent application Ser. No. 17/783,572, filed Jun. 8, 2022; which is a National Stage of PCT/KR2020/018066, filed Dec. 10, 2020; which claims priority to U.S. Provisional Application No. 62/947,528, filed Dec. 12, 2019, each hereby expressly incorporated by reference in its entirety.

FIELD OF THE DISCLOSURE

The present disclosure relates to a method and device for signaling image information in an image coding system.

RELATED ART

Recently, the demand for high-resolution and high-quality images, such as High Definition (HD) images and Ultra High Definition (UHD) images has been increasing in various fields. As the resolution and quality of the image data become higher, the information size or bit size that is being transmitted increases as compared to the existing image data. Therefore, when transmitting image data by using a same medium, such as a conventional (or existing) wired/wireless broadband line, or when using a conventional (or existing) storage medium to store image data, transmission cost and storage cost may be increased.

Accordingly, a high efficiency image compression technique for effectively transmitting or storing and reproducing (or playing-back) information on high-resolution and high-quality image is required.

SUMMARY OF THE DISCLOSURE

Technical Objects

A technical object of the present disclosure is to provide a method and apparatus for increased image coding efficiency.

Another technical object of the present disclosure is to provide a method and device for signaling image information that is applied at a picture level or a slice level.

Technical Solutions

According to an embodiment of the present disclosure, provided herein is an image decoding method performed by a decoding apparatus. The method may include the steps of obtaining indication information including a first flag indicating whether a Sample Adaptive Offset (SAO) procedure for a current block is applied at a picture level or a slice level and prediction related information, parsing information related to the SAO procedure from a picture header or a slice header based on the first flag, generating prediction samples for the current block based on the prediction related information, generating reconstructed samples for the current block based on the prediction samples, and performing the SAO procedure on the reconstructed samples based on the information related to the SAO procedure.

According to another embodiment of the present disclosure, provided herein is an image encoding method performed by an encoding apparatus. The method may include the steps of determining a prediction mode of a current block and deriving prediction samples based on the prediction mode, generating reconstructed samples based on the prediction samples, performing a Sample Adaptive Offset (SAO) procedure on the reconstructed samples, generating indication information including a first flag indicating whether the SAO procedure is applied at a picture level or a slice level, and encoding the indication information and image information including the information related to the SAO procedure. And, herein, the first flag indicates whether the information related to the SAO procedure is present in the picture header or in the slice header.

According to yet another embodiment of the present disclosure, provided herein is a computer readable digital recording medium having encoded image information stored therein that allows an image decoding method to be performed by a decoding apparatus. The image decoding method according to the embodiment may include the steps of obtaining indication information including a first flag indicating whether a Sample Adaptive Offset (SAO) procedure for a current block is applied at a picture level or a slice level and prediction related information, parsing information related to the SAO procedure from a picture header or a slice header based on the first flag, deriving prediction samples for the current block based on the prediction related information, generating reconstructed samples based on the prediction samples, and performing the SAO procedure on the reconstructed samples based on the information related to the SAO procedure.

Effects of the Disclosure

According to the present specification, overall image/video compression efficiency may be increased.

According to the present specification, efficiency in image decoding may be increased, based on indication information indicating whether or not a tool that is applied for a current block is being applied at a picture level or a slice level.

DESCRIPTION OF EXEMPLARY EMBODIMENTS

Figure 1:
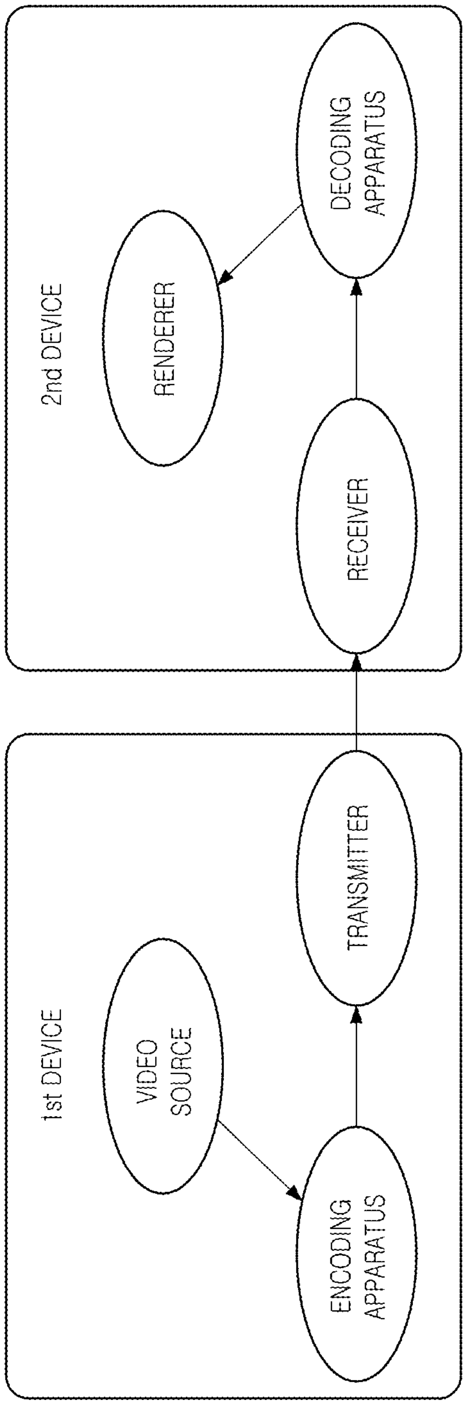
FIG. 1 schematically illustrates an example of a video/image coding system to which the present disclosure is applicable.

The present document may be modified in various forms, and specific embodiments thereof will be described and shown in the drawings. However, the embodiments are not intended for limiting the present document. The terms used in the following description are used to merely describe specific embodiments, but are not intended to limit the present document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each configuration in the drawings described in the present document is shown independently for the convenience of description regarding different characteristic functions, and does not mean that each configuration is implemented as separate hardware or separate software. For example, two or more components among each component may be combined to form one component, or one component may be divided into a plurality of components. An embodiment in which elements are combined and/or separated is also included in the scope of rights of this document unless it deviates from the essence of this document.

In the present disclosure, the term "A or B" may mean "only A", "only B", or "both A and B". In other words, in the present disclosure, the term "A or B" may be interpreted to indicate "A and/or B". For example, in the present disclosure, the term "A, B or C" may mean "only A", "only B", "only C", or "any combination of A, B and C".

A slash "/" or a comma used in the present disclosure may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B", or "both A and B". Further, in the present disclosure, the expression "at least one of A or B" or "at least one of A and/or B" may be interpreted the same as "at least one of A and B".

Further, in the present disclosure, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present disclosure may mean "for example". Specifically, in the case that "prediction (intra prediction)" is expressed, it may be indicated that "intra prediction" is proposed as an example of "prediction". In other words, the term "prediction" in the present disclosure is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

Technical features that are individually described in a diagram of the present specification may be implemented individually, or may be implemented simultaneously.

Hereinafter, a preferred embodiment of the present disclosure will be described in more detail with reference to the appended drawings. Hereinafter, same reference numerals will be used for indicating the same configuration elements within the drawings, and overlapping (or repetitive) description of the same configuration element(s) will be omitted for simplicity.

FIG. 1 schematically illustrates an example of a video/image coding system to which the present disclosure is applicable.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present specification relates to video/image coding. For example, the method/example disclosed in the present specification may be applied to a method that is disclosed in a Versatile Video Coding (VVC) standard, an essential video coding (EVC) standard, an AOMedia Video 1 (AV1) standard, a 2nd generation of audio video coding standard (AVS2), or other next-generation video/image coding standard(s) (e.g., H.267 or H.268, and so on).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles.

A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a width specified by syntax elements in the picture parameter set and a height equal to the height of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice may include a plurality of whole (or complete) tiles or a plurality of consecutive (or contiguous) CTU matrices within one tile of a picture that may be included in one NAL unit. In the present specification, a tile group and a slice may be interchangeably used. For example, in the present specification, a tile group/tile group header may be referred to as a slice/slice header.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

Figure 2:
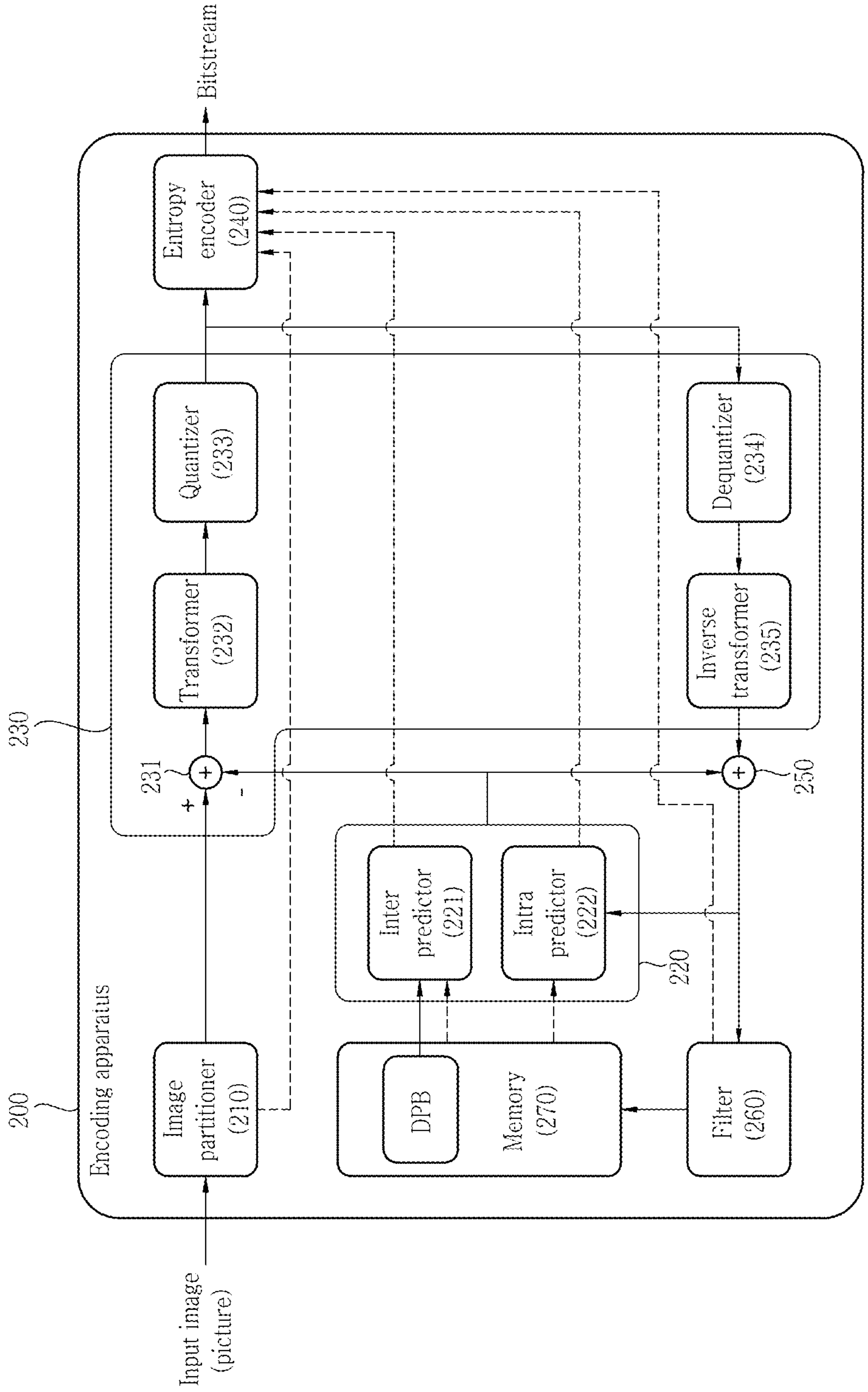
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, a video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, and so on) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, and so on) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage part (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
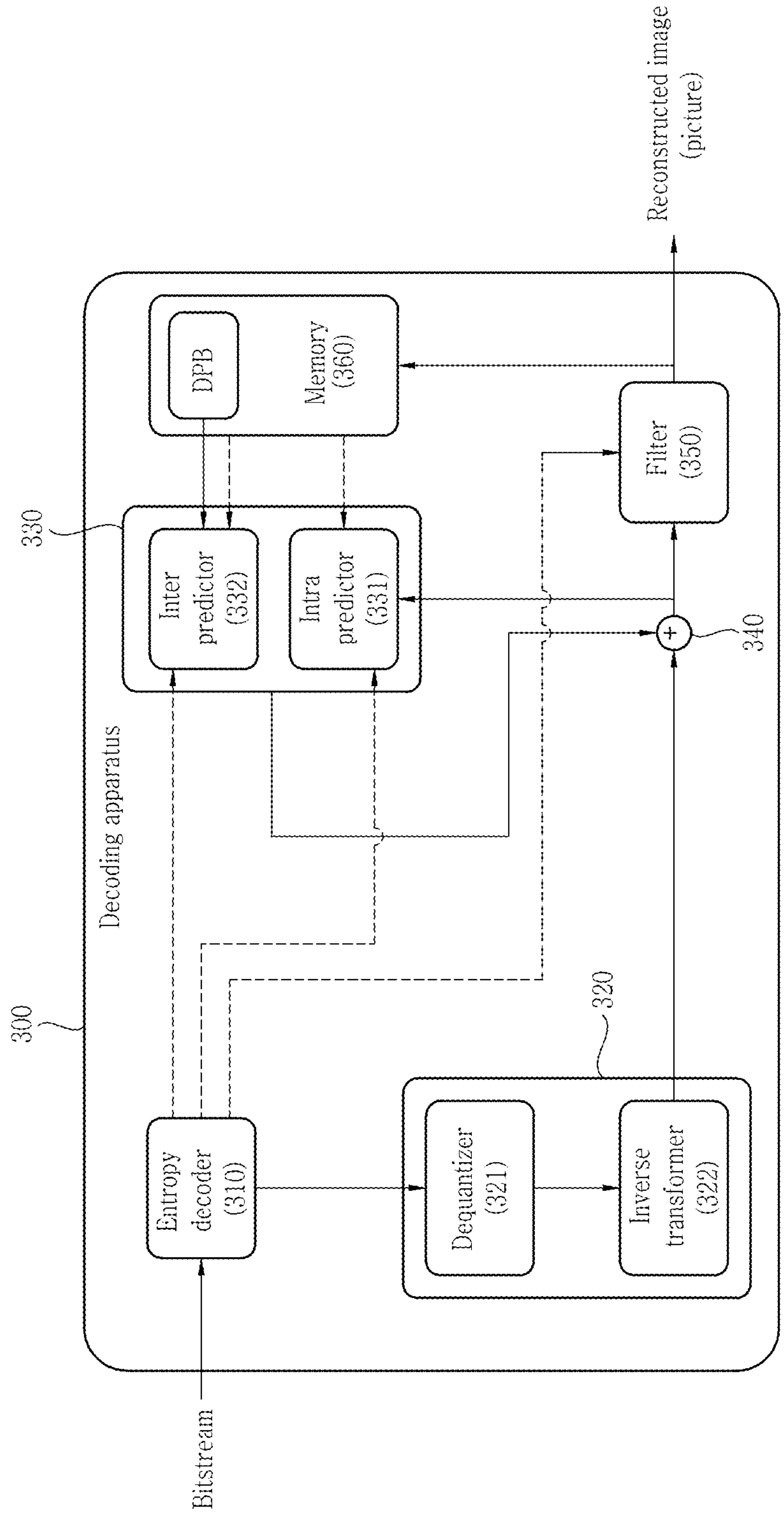
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, and so on) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the filter 260, the inter predictor 221, and the intra predictor 222 of the encoding apparatus 200 may be the same as or respectively applied to correspond to the filter 350, the inter predictor 332, and the intra predictor 331of the decoding apparatus 300. The same may also apply to the inter predictor 332 and the intra predictor 331.

As described above, in video coding, prediction is performed to increase compression efficiency. Through this, it is possible to generate a predicted block including prediction samples for a current block, which is a block to be coded. Here, the predicted block includes prediction samples in a spatial domain (or pixel domain). The predicted block is derived equally from the encoding device and the decoding device, and the encoding device decodes information (residual information) on the residual between the original block and the predicted block, not the original sample value of the original block itself. By signaling to the device, image coding efficiency can be increased. The decoding apparatus may derive a residual block including residual samples based on the residual information, and generate a reconstructed block including reconstructed samples by summing the residual block and the predicted block, and generate a reconstructed picture including reconstructed blocks.

The residual information may be generated through transformation and quantization processes. For example, the encoding apparatus may derive a residual block between the original block and the predicted block, and perform a transform process on residual samples (residual sample array) included in the residual block to derive transform coefficients, and then, by performing a quantization process on the transform coefficients, derive quantized transform coefficients to signal the residual related information to the decoding apparatus (via a bitstream). Here, the residual information may include location information, a transform technique, a transform kernel, and a quantization parameter, value information of the quantized transform coefficients, and so on. The decoding apparatus may perform dequantization/inverse transformation process based on the residual information and derive residual samples (or residual blocks). The decoding apparatus may generate a reconstructed picture based on the predicted block and the residual block. The encoding apparatus may also dequantize/inverse transform the quantized transform coefficients for reference for inter prediction of a later picture to derive a residual block, and generate a reconstructed picture based thereon. In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression. In the present document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present document as well.

Figure 4:
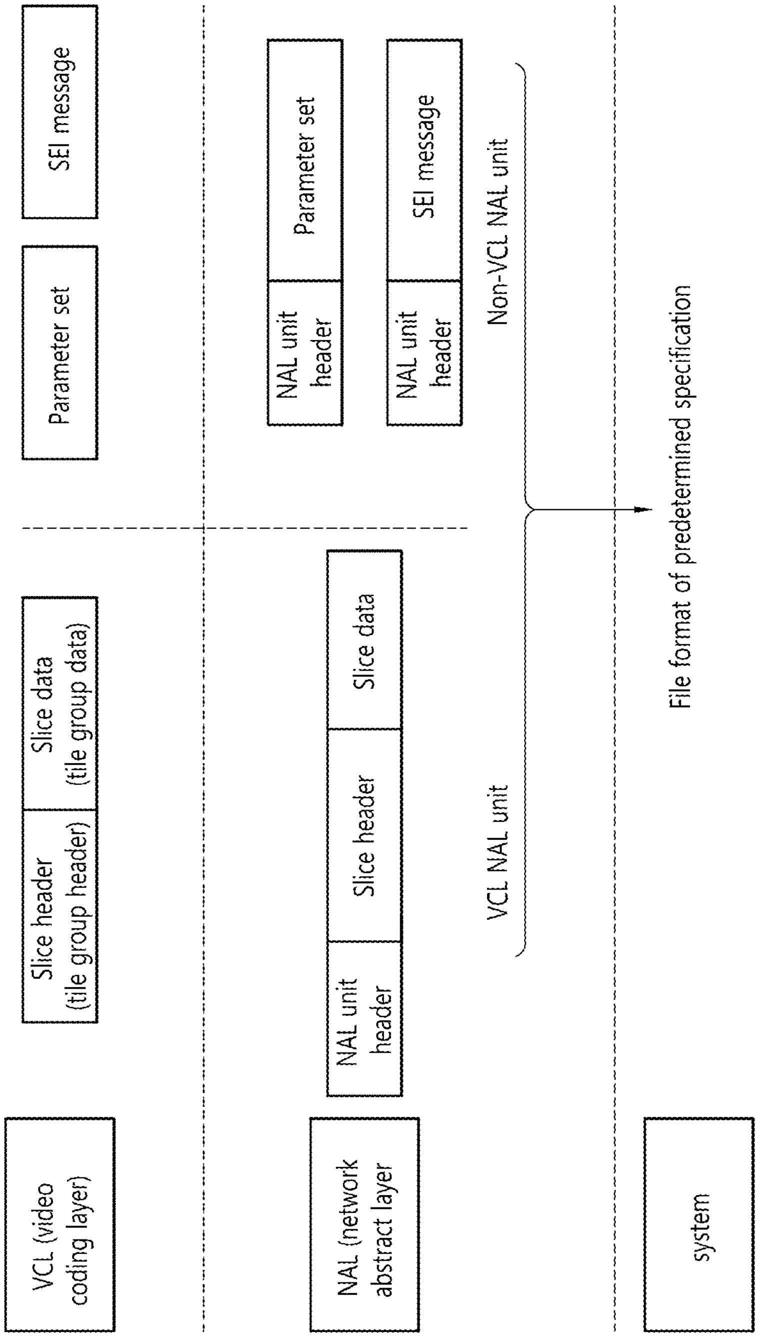
FIG. 4 illustrates an exemplary hierarchical structure of coded data.

FIG. 4 exemplarily shows a hierarchical structure for a coded data.

Referring to FIG. 4, the coded data may be divided into a video coding layer (VCL), which handles coding processing of a video/image and the video/image itself, and a Network abstraction layer (NAL), which is exists between the VCL and a sub-system that stores and transmits the coded video/image.

The VCL may generate a parameter set (picture parameter set (PPS), sequence parameter set (SPS), video parameter set (VPS), and so on) corresponding to a header of a sequence and a picture, and so on, and a supplemental enhancement information (SEI) message that is additionally needed in the coding process of the video/image. The SEI message s separated from the information on the video/image (slice data). The VCL including the information on the video/image is configured of slice data and a slice header. Meanwhile, a slice header may be referred to as a tile group header, and slice data may be referred to as tile group data.

In the NAL, a NAL unit may be generated by adding header information (NAL unit header) to a raw byte sequence payload (RBSP) generated in a VCL. In this case, the RBSP refers to slice data, parameter set, SEI message, and so on, generated in the VCL. The NAL unit header may include NAL unit type information specified according to RBSP data included in the corresponding NAL unit.

A NAL unit performs a role of mapping a coded image to bit sequence of a sub-system, such as a file format, Real-time Transport Protocol (RTP), transport stream (TS), and so on.

As shown in the figure, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), and so on, and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of a NAL unit type that is specified in accordance with a parameter set type that is included in a Non-VCL NAL unit type. For example, the NAL unit type may be specified as one of an Adaptation Parameter Set (APS) NAL unit, which is a NAL unit type including APS, a Decoding Parameter Set (DPS) NAL unit, which is a NAL unit type including DPS, a Video Parameter Set (VPS) NAL unit, which is a NAL unit type including VPS, a Sequence Parameter Set (SPS) NAL unit, which is a NAL unit type including SPS, and a Picture Parameter Set (PPS) NAL unit, which is a NAL unit type including PPS.

The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. The slice header (slice header syntax) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). The high level syntax (HLS) in the present document may include at least one of the APS syntax, the PPS syntax, the SPS syntax, the VPS syntax, the DPS syntax, and the slice header syntax.

In the present document, the image/image information encoded from the encoding apparatus and signaled to the decoding apparatus in the form of a bitstream includes not only partitioning related information in a picture, intra/inter prediction information, residual information, in-loop filtering information, and so on, but also information included in a slice header, information included in the APS, information included in the PPS, information included in an SPS, information included in the VPS and/or information included in the DPS. In addition, the image/image information may further include NAL unit header information.

Figure 5:
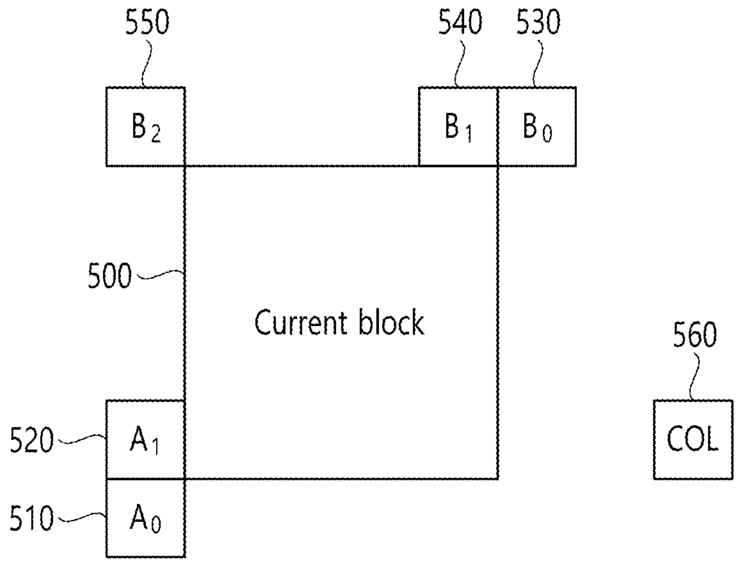
FIG. 5 is a diagram illustrating an example of a candidate block that may be used in a case where inter prediction for a current block is performed.

FIG. 5 is a diagram illustrating an example of a candidate block that may be used in a case where inter prediction for a current block is performed.

A predictor of an encoding apparatus and a decoding apparatus may use a block that is positioned at a predetermined neighboring location from the current block 500 as a candidate block. For example, in the example of FIG. 5, two blocks A0 510 and A1 520 being located at a bottom-left side of the current block and three blocks B0 530, B1 540, and B2 550 being located at a top-right side and a top-left side of the current block may be selected as spatial candidate blocks. Additionally, apart from the spatially adjacent blocks, as a temporal candidate block, the above-described Col block 560 may be used as a candidate block.

Meanwhile, in relation to a reference picture that is used in inter prediction, a reference picture for the current block may be derived from a reference picture of a neighboring block or may be indicated by information that is received from the encoding apparatus. In case of a skip mode or a merge mode, the predictor of the decoding apparatus may use a reference picture of a neighboring block as a reference picture of the current block. In case MVP is applied, the predictor of the decoding apparatus may receive information indicating a reference picture for the current block.

Previously encoded/decoded pictures prior to the current picture are stored in the memory (e.g., Decoded Picture Buffer (DPB)) and may be used for the prediction of the current block (current picture). Pictures that are available for usage in the inter prediction of the current block may be maintained in a reference picture list. At this point, among the reference pictures that are included in the reference picture list, a reference picture that is used for the inter prediction of the current block may be indicated by a reference picture index. That is, a reference picture index may mean an index indicating a reference picture that is used for the inter prediction of the current block, among the reference pictures configuring (or constructing) the reference picture list.

I slice is a slice that is decoded via intra prediction. P slice is a slice that is decoded via intra prediction or inter prediction, which uses a maximum of one motion vector and one reference picture. B slice is a slice that is decoded via intra prediction or inter prediction, which uses a maximum of two motion vectors and two reference pictures. At this point, a reference picture may include a Short Term Reference Picture (STRP) (hereinafter referred to as "STRP") and a Long Term Reference Picture (LTRP) (hereinafter referred to as "LTRP").

Herein, a STRP and an LTRP may be reconstructed pictures that are stored in the Decoded Picture Buffer (DPB). The STRP may be marked as "used for short-term reference" or "used for reference". Additionally, the LTRP may be marked as "used for long-term reference" or "used for reference". For example, a POC difference between a decoding target picture and a long-term reference picture (LTRP) may be given a value corresponding to a range from '1' to '224-1'. Herein, a Picture Order Count (POC) may indicate a picture display order.

Reference picture list 0 (hereinafter referred to as 'L0' for simplicity in the description) is a reference picture list that is used for inter prediction of P slice or B slice. Reference picture list 1 (hereinafter referred to as 'L1' for simplicity in the description) may be used for inter prediction of B slice. Therefore, when performing inter prediction for a block of P slice, a one-direction (or single direction) prediction that is based on L0 may be performed. And, when performing inter prediction for a block of B slice, a bi-prediction may be performed based on L0 and L1.

When performing encoding and/or decoding on P slice and B slice via inter prediction, the encoding apparatus and/or decoding apparatus may construct a reference picture list. At this point, a reference picture that is used for inter prediction may be designated by a reference picture index. As described above, a reference picture index may mean an index that indicates a reference picture within a reference picture list that is used for inter prediction.

A reference picture list may be constructed based on a reference picture set that is determined or generated by the encoding apparatus and the decoding apparatus. Reference pictures that construct the reference picture list may be stored in the memory (e.g., DPB). The pictures that are stored in the memory (previously encoded/decoded pictures prior to the current picture) may be managed by the encoding apparatus and the decoding apparatus.

Meanwhile, as described above, in order to enhance subjective/objective picture quality, the encoding apparatus/decoding apparatus may perform an in-loop filtering procedure for a reconstructed picture. A modified reconstructed picture may be generated through the in-loop filtering procedure, and the modified reconstructed picture may be outputted from the decoding apparatus as a decoded picture and may also be stored in the decoded picture buffer or memory of the encoding apparatus/the decoding apparatus.

Additionally, in a later process, the modified reconstructed picture may be used as a reference picture in an inter prediction procedure when performing encoding/decoding. As described above, the in-loop filtering procedure may include a deblocking filtering procedure, a sample adaptive offset (SAO) procedure, and/or an adaptive loop filter (ALF) procedure. In this case, one or part of the deblocking filtering procedure, the sample adaptive offset (SAO) procedure, and the adaptive loop filter (ALF) procedure may be sequentially applied, or all of the procedures may be sequentially applied. For example, after applying the deblocking filtering procedure to a reconstructed picture, the SAO procedure may be performed. Alternatively, for example, after applying the deblocking filtering procedure to the reconstructed picture, the ALF procedure may be performed. This may be identically performed in the encoding apparatus.

The deblocking filtering procedure is a procedure that removes any distortion generated a reconstructed picture at a boundary between blocks. For example, the deblocking filtering procedure may derive a target boundary from the reconstructed picture, determine a boundary strength (bS) for the target boundary, and perform deblocking filtering for the target boundary based on the determined bS. The bS may be determined based on the prediction modes of two blocks being adjacent to the target block, a motion vector difference, whether or not the reference picture is the same, whether or not a non-zero significant coefficient exists, and so on.

The SAO procedure is a method for compensating an offset different between a reconstructed picture and an original picture in sample units. For example, the SAO procedure may be applied in accordance to an offset type, such as a band offset, an edge offset, and so on. According to the SAO, a sample may be sorted as different categories in accordance with the SAO type, and an offset value may be added to each sample in accordance with the category. Filtering information for the SAO may include information on the application or non-application of SAO, SAO type information, and SAO offset value information. For example, the SAO may be applied to a reconstructed picture after the application of deblocking filtering.

The adaptive loop filter (ALF) procedure is a procedure for filtering a reconstructed picture in sample units, based on a filter coefficient according to a filter shape. The encoding apparatus may compare the reconstructed picture with the original picture so as to determine whether or not to apply the ALF, the ALF shape, and/or the ALF filtering coefficient, and so on, and may signal the reconstructed picture to the encoding apparatus. That is, the filtering information on the ALF procedure may include information on whether or not to apply the ALF, ALF shape information, ALF filtering coefficient information, and so on. The ALF procedure may be applied to a reconstructed picture after the application of deblocking filtering.

Figure 6:
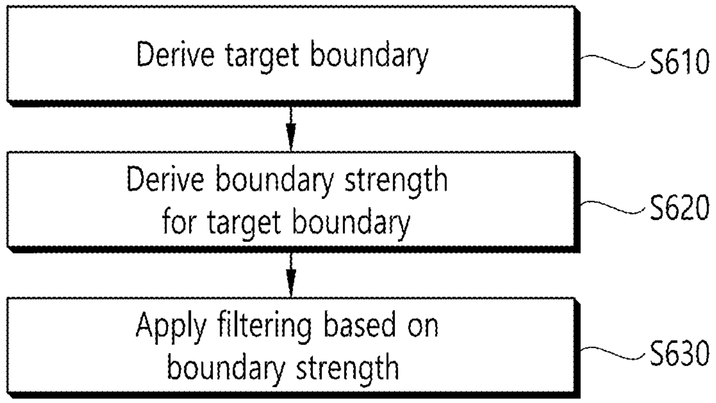
FIG. 6 is a flowchart illustrating a method for performing deblocking filtering.

FIG. 6 is a flowchart illustrating a method for performing deblocking filtering.

As described above, the encoding apparatus/decoding apparatus may reconstruct a picture in block units. When performing such image reconstruction in block units, a block distortion may occur at a boundary between blocks within the reconstructed picture. Therefore, in order to remove the block distortion that occurs at the boundary between blocks within the reconstructed picture, the encoding apparatus and the decoding apparatus may use a deblocking filter.

Therefore, the encoding apparatus/decoding apparatus may derive a boundary between blocks having deblocking filtering performed therein within the reconstructed picture. Meanwhile, a boundary having deblocking filtering performed therein may be referred to as an edge. Additionally, the boundary having deblocking filtering performed therein may include two different types, and the two different types of boundaries may be a vertical boundary and a horizontal boundary. The vertical boundary may also be referred to as a vertical edge, and the horizontal boundary may also be referred to as a horizontal edge. The encoding apparatus/decoding apparatus may perform deblocking filtering on the vertical edge and may also perform deblocking filtering on the horizontal edge.

For example, the encoding apparatus/decoding apparatus may derive a target boundary that is to be processed with filtering from the reconstructed picture (S610).

Additionally, the decoding apparatus/decoding apparatus may determine a boundary strength (bS) for a boundary having deblocking filtering performed therein (S620). The bS may also be indicated as a boundary filtering strength. For example, a case where a bS value for a boundary (block edge) between block P and block Q is obtained may be assumed. In this case, the encoding apparatus/decoding apparatus may obtain a bS value for a boundary (block edge) between block P and block Q based on the block P and the block Q. For example, bS may be determined in accordance with the table shown below.

TABLE 1

| |
|---|
| The variable bS[ $xD_i$ ][ $yD_j$ ] is derived as follows: |
| If cIdx is equal to 0 and both samples $p_0$ and $q_0$ are in a coding block with intra_bdpcm_flag equal to 1, bS[ $xD_i$ ][ $yD_j$ ] is set equal to 0. |
| Otherwise, if the sample $p_0$ or $q_0$ is in the coding block of a coding unit coded with intra prediction mode, bS[ $xD_i$ ][ $yD_j$ ] is set equal to 2. |
| Otherwise, if the block edge is also a transform block edge and the sample $p_0$ or $q_0$ is in a coding block with ciip_flag equal to 1, bS[ $xD_i$ ][ $yD_j$ ] is set equal to 2. |
| Otherwise, if the block edge is also a transform block edge and the sample $p_0$ or $q_0$ is in a transform block which contains one or more non-zero transform coefficient levels, bS[ $xD_i$ ][ $yD_j$ ] is set equal to 1. |
| Otherwise, if the prediction mode of the coding subblock containing the sample $p_0$ is different from the prediction mode of the coding subblock containing the sample $q_0$, bS[ $xD_i$ ][ $yD_j$ ] is set equal to 1. |
| Otherwise, if cIdx is equal to 0 and one or more of the following conditions are true, bS[ $xD_i$ ][ $yD_j$ ] is set equal to 1: |
| The coding subblock containing the sample $p_0$ and the coding subblock containing the sample $q_0$ are both coded in IBC prediction mode, and the absolute difference between the horizontal or vertical component of the motion vectors used in the prediction of the two coding subblocks is greater than or equal to 4 in units of quarter luma samples. |
| For the prediction of the coding subblock containing the sample $p_0$ different reference pictures or a different number of motion vectors are used than for the prediction of the coding subblock containing the sample $q_0$. |
| One motion vector is used to predict the coding subblock containing the sample $p_0$ and one motion vector is used to predict the coding subblock containing the sample $q_0$, and the absolute difference between the |

TABLE 1-continued

| |
|---|
| horizontal or vertical component of the motion vectors used is greater than or equal to 4 in units of quarter luma samples. |
| Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 4 in units of quarter luma samples. |
| Two motion vectors for the same reference picture are used to predict the coding subblock containing the sample $p_0$, two motion vectors for the same reference picture are used to predict the coding subblock containing the sample $q_0$ and both of the following conditions are true: |
| The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples. |
| The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 4 in units of quarter luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 4 in units of quarter luma samples. |
| Otherwise, the variable bS[ $xD_i$ ][ $yD_j$ ] is set equal to 0. |

Herein, p may indicate a sample of block P that is adjacent to the deblocking filtering target boundary, and q may indicate a sample of block Q that is adjacent to the deblocking filtering target boundary.

Additionally, for example, the p0 may indicate a sample of a block that is adjacent to a left side or top side of the deblocking filtering target boundary, and the q0 may indicate a sample of a block that is adjacent to a right side or bottom side of the deblocking filtering target boundary. For example, in case a direction of the target boundary is vertical (i.e., in case the target boundary is a vertical boundary), the p0 may indicate a sample of a block that is adjacent to the left side of the deblocking filtering target boundary, and the q0 may indicate a sample of a block that is adjacent to the right side of the deblocking filtering target boundary. Alternatively, for example, in case a direction of the target boundary is horizontal (i.e., in case the target boundary is a horizontal boundary), the p0 may indicate a sample of a block that is adjacent to the top side of the deblocking filtering target boundary, and the 90 may indicate a sample of a block that is adjacent to the bottom side of the deblocking filtering target boundary.

Referring back to FIG. 6, the encoding apparatus/decoding apparatus may perform blocking filtering based on the bS (S630). For example, when the bS value is equal to 0, deblocking filtering is not applied to the target boundary. Meanwhile, based on the determined bS value, the filter that is applied to the boundary between blocks may be determined. The filter may be categorized as a strong filter and a weak filter. By performing filtering using different filters for each of a boundary of a position with a high likelihood of having block distortion occur therein and a boundary of a position with a low likelihood of having block distortion occur therein within the reconstructed picture, the encoding apparatus/decoding apparatus may increase coding efficiency.

Figure 7:
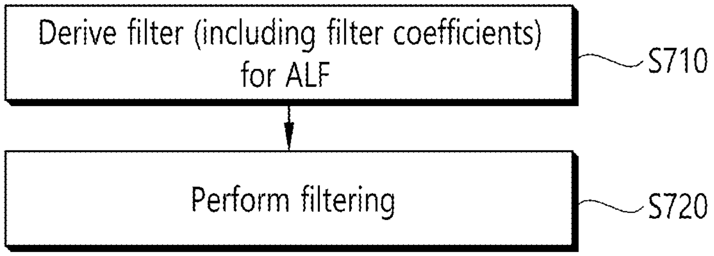
FIG. 7 is a flowchart schematically illustrating an example of an ALF procedure.

FIG. 7 is a flowchart schematically illustrating an example of an ALF process. The ALF process disclosed in FIG. 7 may be performed in an encoding apparatus and a decoding apparatus. In this document, the coding apparatus may include the encoding apparatus and/or the decoding apparatus.

Referring to FIG. 7, the coding apparatus derives a filter for ALF (S710). The filter may include filter coefficients. The coding apparatus may determine whether to apply the ALF, and when determining to apply the ALF, may derive a filter including filter coefficients for the ALF. Information for deriving a filter (coefficients) for ALF or a filter (coefficients) for ALF may be referred to as an ALF parameter. Information on whether ALF is applied (i.e., ALF enabled flag) and ALF data for deriving the filter may be signaled from the encoding apparatus to the decoding apparatus. ALF data may include information for deriving a filter for the ALF. Also, for example, for hierarchical control of ALF, an ALF enabled flag may be signaled at the SPS, picture header, slice header, and/or CTB level, respectively.

In order to derive the filter for the ALF, the activity and/or directivity of the current block (or ALF target block) is derived, and the filter may be derived based on the activity and/or the directionality. For example, the ALF process may be applied in units of 4×4 blocks (based on luma components). The current block or the ALF target block may be, for example, a CU, or may be a 4×4 block within a CU. Specifically, for example, filters for ALF may be derived based on first filters derived from information included in the ALF data and predefined second filters, and the coding apparatus may select one of the filters based on the activity and/or the directionality. The coding apparatus may use filter coefficients included in the selected filter for the ALF.

The coding apparatus performs filtering based on the filter (S720). Modified reconstructed samples may be derived based on the filtering. For example, the filter coefficients in the filter may be arranged or allocated according to a filter shape, and the filtering may be performed on reconstructed samples in the current block. Here, the reconstructed samples in the current block may be reconstructed samples after the deblocking filter process and the SAO process are completed. For example, one filter shape may be used, or one filter shape may be selected and used from among a plurality of predetermined filter shapes. For example, a filter shape applied to the luma component and a filter shape applied to the chroma component may be different. For example, a 7×7 diamond filter shape may be used for the luma component, and a 5×5 diamond filter shape may be used for the chroma component.

Figure 8:
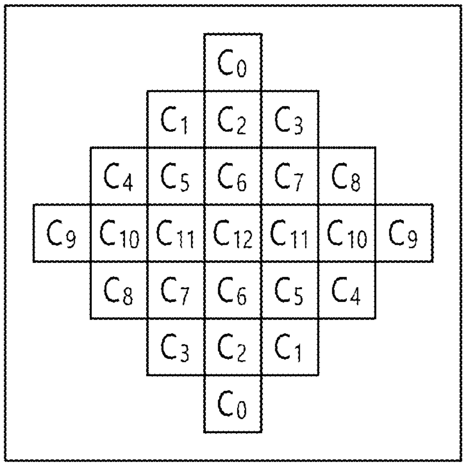
FIG. 8 illustrates an example of a filter shape for ALF.
Figure 8:
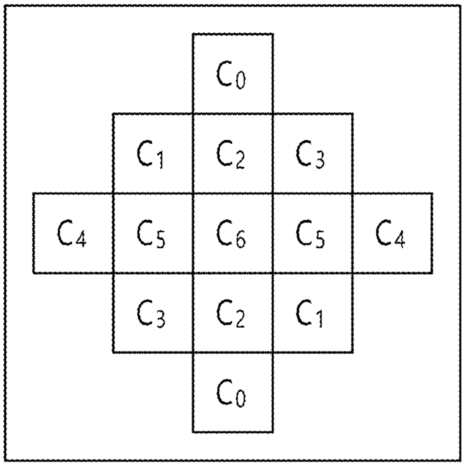

FIG. 8 illustrates an example of a filter shape for ALF. C0~C11 of (a) and C0~C5 of (b) may be filter coefficients that are depend on positions within each filter shape.

The (a) of FIG. 8 shows the shape of a 7×7 diamond filter, and the (b) of FIG. 8 shows the shape of a 5×5 diamond filter. In FIG. 8, Cn in the filter shape represents a filter coefficient. When n in Cn is the same, this indicates that the same filter coefficients can be assigned. In the present document, a position and/or unit to which filter coefficients are assigned according to the filter shape of the ALF may be referred to as a filter tab. In this case, one filter coefficient may be assigned to each filter tap, and the arrangement of the filter taps may correspond to a filter shape. A filter tab located at the center of the filter shape may be referred to as a center filter tab. The same filter coefficients may be assigned to two filter taps of the same n value that exist at positions corresponding to each other with respect to the center filter tap. For example, in the case of a 7×7 diamond filter shape, 25 filter taps are included, and since filter coefficients C0 to C11 are assigned in a centrally symmetric form, filter coefficients may be assigned to the 25 filter taps using only 13 filter coefficients. Also, for example, in the case of a 5×5 diamond filter shape, 13 filter taps are included, and since filter coefficients C0 to C5 are assigned in a centrally symmetrical form, filter coefficients may be assigned to the 13 filter taps using only 7 filter coefficients. For example, in order to reduce the data amount of signaled information on filter coefficients, 12 filter coefficients among 13 filter coefficients for the 7×7 diamond filter shape may be signaled (explicitly), and one filter coefficient may be derived (implicitly). Also, for example, 6 filter coefficients among 7 filter coefficients for a 5×5 diamond filter shape may be signaled (explicitly) and one filter coefficient may be derived (implicitly).

According to an embodiment of the present document, the ALF parameter used for the ALF process may be signaled through an adaptation parameter set (APS). The ALF parameter may be derived from filter information for the ALF or ALF data.

The ALF is a type of in-loop filtering technique that can be applied in video/image coding as described above. The ALF may be performed using a Wiener-based adaptive filter. This may be to minimize a mean square error (MSE) between original samples and decoded samples (or reconstructed samples). A high level design for an ALF tool may incorporate syntax elements accessible from the SPS and/or slice header (or tile group header).

Meanwhile, a picture header includes syntax elements being applied to the picture header, and the syntax elements may be applied to all slices of a picture that is related to the picture header. When a specific syntax element is applied only to a specific slice, the specific syntax element should be signaled from a slice header and not the picture header.

In the prior art, signaling of a control flag and parameters for enabling or disabling multiple tools for picture encoding or decoding existed in the picture header and were overridden in the slice header. This method provides flexibility that allows tool control to be performed at both the picture level and the slice level. However, when using this method, since the slice header is required to be verified after verifying the picture header, this method may burden the decoder.

Accordingly, the embodiment of the present disclosure proposes indication information indicating whether or not at least one tool is being applied at a picture level or a slice level. At this point, the indication information may be included in any one of a Sequence Parameter Set (SPS) and a Picture Parameter Set (PPS). That is, when a specific tool is activated (or enabled) within a CLVS, an indication or flag for indicating whether or not the specific tool is being applied at a picture level or a slice level may be signaled from a parameter set, such as SPS or PPS. Although the indication or flag may correspond to one tool, the present disclosure will not be limited only to this. For example, an indication or flag for indicating whether or not all tools, and not only a specific tool, are being applied at a picture level or a slice level may be signaled from a parameter set, such as SPS or PPS.

Although the control flag and parameters for enabling or disabling tools may be signaled at a picture level or slice level, the signaling is not performed at both the picture level and the slice level. For example, in case of obtaining indication information indicating whether or not a specific tool is being applied at a picture level, the control flag and parameters for enabling or disabling the specific tool may be signaled only from the picture header. Similarly, in case of obtaining indication information indicating whether or not a specific tool is being applied at a slice level, the control flag and parameters for enabling or disabling the specific tool may be signaled only from the slice level.

Additionally, for example, a tool that is designated to be applied at a picture level from a specific parameter set may be designated to be applied at a slice level from another parameter set of the same type.

For example, a PPS syntax including indication information may be as shown below in the following table.

TABLE 2

| | Descriptor |
|---|---|
| pic_parameter_set_rbsp( ) { | |
| ... | |
| **rpl_present_in_ph_flag** | u(1) |
| **sao_present_in_ph_flag** | u(1) |
| **alf_present_in_ph_flag** | u(1) |
| **deblocking_filter_control_present_flag** | u(1) |
| if( deblocking_filter_control_present_flag ) { | |
| **deblocking_filter_ph_override_enabled_flag** | u(1) |
| **deblocking_filter_sh_override_enabled_flag** | u(1) |
| **pps_deblocking_filter_disabled_flag** | u(1) |
| if( !pps_deblocking_filter_disabled_flag ) { | |
| **pps_beta_offset_div2** | se(v) |
| **pps_tc_offset_div2** | se(v) |
| } | |
| } | |
| **constant_slice_header_params_enabled_flag** | u(1) |
| ... | |
| } | |

Semantics of syntax elements included in the syntax of Table 2 may, for example, be indicated as shown below in Table 3.

TABLE 3

| |
|---|
| rpl_present_in_ph_flag equal to 1 specifies the reference picture list signalling may be present in the PHs referring to the PPS. rpl_present_in_ph_flag equal to 0 specifies the reference picture list signalling may be present in the slice headers referring to the PPS. |
| sao_present_in_ph_flag equal to 1 specifies the syntax elements for enabling SAO use may be present in the PHs referring to the PPS. sao_present_in_ph_flag equal to 0 specifies the syntax elements for enabling SAO use may be present in the slice headers referring to the PPS. |

TABLE 3-continued

| |
|---|
| alf_present_in_ph_flag equal to 1 specifies the syntax elements for enabling ALF use may be present in the PHs referring to the PPS. alf_present_in_ph_flag equal to 0 specifies the syntax elements for enabling ALF use may be present in the slice headers referring to the PPS. |
| deblocking_filter_ph_override_enabled_flag equal to 1 specifies the presence of pic_deblocking_filter_override_flag in the PHs referring to the PPS. deblocking_filter_ph_override_enabled_flag equal to 0 specifies the absence of pic_deblocking_filter_override_flag in PHs referring to the PPS. When not present, the value of deblocking_filter_ph_override_enabled_flag is inferred to be equal to 0. |
| deblocking_filter_sh_override_enabled_flag equal to 1 specifies the presence of slice_deblocking_filter_override_flag in the slice headers referring to the PPS. deblocking_filter_sh_override_enabled_flag equal to 0 specifies the absence of slice_deblocking_filter_override_flag in slice headers referring to the PPS. When not present, the value of deblocking_filter_sh_override_enabled_flag is inferred to be equal to 0. |
| It is a requirement of bitstream conformance that, the value of deblocking_filter_ph_override_enabled_flag and deblocking_filter_sh_override_enabled_flag shall not both be equal to 1. |

Referring to the tables that are presented above, indication information may include a flag indicating whether or not signaling of a reference picture list is applied at a picture level or a slice level. For example, the indication information may designate whether information related to the signaling of a reference picture list is present (or exists) in the picture header or is present (or exists) in the slice header. For example, the flag may be indicated as rpl_present_in_ph_flag. Based on a case where a value of the corresponding flag is equal to 1, the information related to the signaling of a reference picture list is present in the picture header. And, based on a case where a value of the corresponding flag is equal to 0, the information related to the signaling of a reference picture list is present in the slice header.

Additionally, the indication information may include a flag indicating whether or not a Sample Adaptive Offset (SAO) procedure is being applied at a picture level or a slice level. For example, the indication information may designate whether information related to the SAO procedure is present (or exists) in the picture header or is present (or exists) in the slice header. For example, the flag may be indicated as sao_present_in_ph_flag. Based on a case where a value of the corresponding flag is equal to 1, the information related to the SAO procedure is present in the picture header. And, based on a case where a value of the corresponding flag is equal to 0, the information related to the SAO procedure is present in the slice header.

Additionally, the indication information may include a flag indicating whether or not an Adaptive Loop Filter (ALF) procedure is being applied at a picture level or a slice level. For example, the indication information may designate whether information related to the ALF procedure is present (or exists) in the picture header or is present (or exists) in the slice header. For example, the flag may be indicated as alf_present_in_ph_flag. Based on a case where a value of the corresponding flag is equal to 1, the information related to the ALF procedure is present in the picture header. And, based on a case where a value of the corresponding flag is equal to 0, the information related to the ALF procedure is present in the slice header.

Additionally, the indication information may include at least one flag indicating whether or not a deblocking procedure is being applied at a picture level or a slice level. For example, based on the at least one flag, information related to the deblocking procedure may be present (or may exist) in any one of the picture header and a slice header. For example, the at least one flag may be indicated as deblocking_filter_ph_override_enabled_flag or deblocking_filter_sh_override_enabled_flag. For example, based on a case where a value of the at least one flag is equal to 1, a flag indicating whether or not a parameter related to the deblocking procedure is present in the picture header may be present in the picture header. And, based on a case where a value of the at least one flag is equal to 0, a flag indicating whether or not a parameter related to the deblocking procedure is present in the picture header may not be present in the picture header.

Alternatively, based on a case where a value of the at least one flag is equal to 1, a flag indicating whether or not a parameter related to the deblocking procedure is present in the slice header may be present in the slice header. And, based on a case where a value of the at least one flag is equal to 0, a flag indicating whether or not a parameter related to the deblocking procedure is present in the slice header may not be present in the slice header. At this point, values of deblocking_filter_ph_override_enabled_flag and deblocking_filter_sh_override_enabled_flag may not be both equal to 1. Meanwhile, a picture header syntax may be as shown below in the following table.

TABLE 4

| | Descriptor |
|---|---|
| picture_header_rbsp( ) { | |
| ... | |
| if( rpl_present_in_ph_flag ) { | |
| for( i = 0; i < 2; i++ ) { | |
| if( num_ref_pic_list_in_sps[ i ] > 0 && | |
| !pps_ref_pic_list_sps_idc[ i ] && | |
| ( i == 0 \| \| ( i == 1 && rpl1_idx_present_flag ) ) ) | |
| **pic_rpl_sps_flag**[ i ] | u(1) |
| if( pic_rpl_sps_flag[ i ] ) { | |
| if( num_ref_pic_lists_in_sps[ i ] > 1 && | |
| ( i = = 0 \| \| ( i = = 1 && rpl1_idx_present_flag ) ) ) | |
| **pic_rpl_idx**[ i ] | u(v) |
| } else | |
| ref_pic_list_struct( i, num_ref_pic_lists_in_sps[ i ] ) | |

TABLE 4-continued

```
                                                              Descriptor
    for( j = 0; j < NumLtrpEntries[ i ][ RplsIdx[ i ] ]; j++ ) {
      if( ltrp_in_slice_header_flag[ i ][ RplsIdx[ i ] ] )
        pic_poc_lsb_lt[ i ][ j ]                              u(v)
      pic_delta_poc_msb_present_flag[ i ][ j ]                u(1)
      if( pic_delta_poc_msb_present_flag[ i ][ j ] )
        pic_delta_poc_msb_cycle_lt[ i ][ j ]                  ue(v)
    }
  }
}
...
if( sps_sao_enabled_flag && sao_present_in_ph_flag ) {
  pic_sao_luma_enabled_flag                                   u(1)
  if(ChromaArrayType != 0 )
    pic_sao_chroma_enabled_flag                               u(1)
}
if( sps_alf_enabled_flag && alf_present_in_ph_flag ) {
  pic_alf_enabled_flag                                        u(1)
  if( pic_alf_enabled_flag ) {
    pic_num_alf_aps_ids_luma                                  u(3)
    for( i = 0; i < pic_num_alf_aps_ids_luma; i++ )
      pic_alf_aps_id_luma[ i ]                                u(3)
    if( ChromaArrayType != 0 )
      pic_alf_chroma_idc                                      u(2)
    if( pic_alf_chroma_idc )
      pic_alf_aps_id_chroma                                   u(3)
  }
}
...
if( deblocking_filter_ph_override_enabled_flag ) {
  pic_deblocking_filter_override_present_flag                 u(1)
  if( pic_deblocking_filter_override_present_flag ) {
    pic_deblocking_filter override_flag                       u(1)
    if( pic_deblocking_filter_override_flag ) {
      pic_deblocking_filter_disabled_flag                     u(1)
      if( !pic_deblocking_filter_disabled_flag ) {
        pic_beta_offset_div2                                  se(v)
        pic_tc_offset_div2                                    se(v)
      }
    }
  }
}
...
}
```

Semantics of syntax elements included in the syntax of Table 4 may, for example, be indicated as shown below in Table 5.

TABLE 5

| |
|---|
| pic_deblocking_filter_override_present_flag equal to 1 specifies that pic_deblocking_filter_override_flag is present in the PH. pic_deblocking_filter_override_present_flag equal to 0 specifies that pic_deblocking_filter_override_flag is not present in the PH. When pic_deblocking_filter_override_present_flag is not present, it is inferred to be equal to 0. |
| pic_deblocking_filter_override_flag equal to 1 specifies that deblocking parameters are present in the PH. pic_deblocking_filter_override_flag equal to 0 specifies that deblocking parameters are not present in the PH. When not present, the value of pic_pic_deblocking_filter_override_flag is inferred to be equal to 0. |
| pic_deblocking_filter_disabled_flag equal to 1 specifies that the operation of the deblocking filter is not applied for the slices associated with the PH. pic_deblocking_filter_disabled_flag equal to 0 specifies that the operation of the deblocking filter is applied for the slices associated with the PH. When pic_deblocking_filter_disabled_flag is not present, it is inferred to be equal to pps_deblocking_filter_disabled_flag. |
| pic_beta_offset_div2 and pic_tc_offset_div2 specify the deblocking parameter offsets for β and tC (divided by 2) for the slices associated with the PH. The values of pic_beta_offset_div2 and pic_tc_offset_div2 shall both be in the range of −6 to 6, inclusive. When not present, the values of pic_beta_offset_div2 and pic_tc_offset_div2 are inferred to be equal to pps_beta_offset_div2 and pps_tc_offset_div2, respectively. |

Referring to the tables that are presented above, when a value of deblocking_filter_ph_override_enabled_flag, which corresponds to a flag indicating whether or not the deblocking procedure is being applied at the picture level, is equal to 1, pic_deblocking_filter_override_present_flag may be signaled. When a value of pic_deblocking_filter_override_present_flag is equal to 1, the pic_deblocking_filter_override_flag, which corresponds to a flag indicating whether or not a parameter related to the deblocking procedure is present in the picture header, may be present in the picture header. Alternatively, when a value of pic_deblocking_filter_override_present_flag is equal to 0, pic_deblocking_filter_override_flag, which corresponds to a flag indicating whether or not a parameter related to the deblocking procedure is present in the picture header, may not be present in the picture header.

Additionally, when a value of the pic_deblocking_filter_override_flag, which corresponds to a flag indicating whether or not a parameter related to the deblocking procedure is present in the picture header, is equal to 1, the deblocking parameters may be present (or may exist) in the picture header. And, when a value of the pic_deblocking_filter_override_flag, which corresponds to a flag indicating whether or not a parameter related to the deblocking procedure is present in the picture header, is equal to 0, the deblocking parameters may not be present (or may not exist) in the picture header.

Additionally, when a value of pic_deblocking_filter_disabled_flag is equal to 1, a deblocking filter may not be applied for slices being related to the picture header. And, when a value of pic_deblocking_filter_disabled_flag is equal to 0, a deblocking filter may be applied for slices being related to the picture header.

Additionally, pic_beta_offset_div2 and pic_tc_offset_div2 may respectively designate deblocking parameter offset for β and tC (value divided by 2) for slices related to the picture header. Values of pic_beta_offset_div2 and pic_tc_offset_div2 may all be within a range of −6 to 6.

Meanwhile, a slice header syntax may be as shown below in the following table.

TABLE 6

| | Descriptor |
|---|---|
| slice_header( ) { | |
| ... | |
| if( !rpl_present_in_ph_flag &&( ( nal_unit_type != IDR_W_RADL && | |
| nal_unit_ty | |
| pe != | |
| IDR_N_LP) \|\| sps_idr_rpl_present_flag ) ) { | |
| for( i = 0; i < 2; i++ ) { | |
| if( num_ref_pic_lists_in_sps[ i ] > 0 && !pps_ref_pic_list_sps_idc[ i ] && | |
| ( i == 0 \|\| ( i == 1 && rpl1_idx_present_flag ) ) ) | |
| slice_rpl_sps_flag[ i ] | u(1) |
| if( slice_rpl_sps_flag[ i ] ) { | |
| if( num_sef_pic_lists_in_sps[ i ] > 1 && | |
| ( i == 0 \|\| ( i == 1 && rpl1_idx_present_flag ) ) ) | |
| slice_rpl_idx[ i ] | u(v) |
| } else | |
| ref_pic_list_struct( i, num_ref_pic_lists_in_sps[ i ] ) | |
| for( j = 0; j < NumLtrpEntries[ i ][ RplsIdx[ i ] ]; j++ ) { | |
| if( ltrp_in_slice_header_flag[ i ][ RplsIdx[ i ] ] ) | |
| slice_poc_lsb_lt[ i ][ j ] | u(v) |
| slice_delta_poc_msb_present_flag[ i ][ j ] | u(1) |
| if( slice_delta_poc_msb_present_flag[ i ][ j ] ) | |
| slice_delta poc_msb_cycle_lt[ i ][ j ] | ue(v) |
| } | |
| } | |
| } | |
| if( rpl_present_in_ph_flag \|\| ( ( nal_unit_type != IDR_W_RADL && nal_unit_ty | |
| pe != | |
| IDR_N_LP) \|\| sps_idx_rpl_present_flag ) ) { | |
| if( ( slice_type != I && num_ref_entries[ 0 ][ RplsIdx[ 0 ] ] > 1 ) \|\| | |
| ( slice_type == B && num_ref_entries[ 1 ][ RplsIdx[ 1 ] ] > 1 ) ) { | |
| num_ref_idx_active_override_flag | u(1) |
| if( num_ref_idx_active_override_flag ) | |
| for( i = 0; i < ( slice_type == B ? 2: 1 ); i++ ) | |
| if( num_ref_entries[ i ][ RplsIdx[ i ] ] > 1 ) | |
| num_ref_idx_active_minus1[ i ] | ue(v) |
| } | |
| } | |
| ... | |
| if( sps_sao_enabled_flag && !sao_present_in_ph_flag ) { | |
| slice_sao_luma_flag | u(1) |
| if( ChromaArrayType != 0 ) | |
| slice_sao_chroma_flag | u(1) |
| } | |
| if( sps_alf_enabled_flag && !alf_present_in_ph_flag ) { | |
| slice_alf_enabled_flag | u(1) |
| if( slice_alf_enabled_flag ) { | |
| slice_num_alf_aps_ids_luma | u(3) |
| for( i = 0; i < slice_num_alf_aps_ids_luma; i++ ) | |
| slice_alf_aps_id_luma[ i ] | u(3) |
| if( ChromaArrayType != 0 ) | |
| slice_alf chroma_idc | u(2) |
| if( slice_alf_chroma_idc ) | |
| slice_alf_aps_id_chroma | u(3) |
| } | |
| } | |
| if( deblocking_filter_sh_override_enabled_flag) | |
| slice_deblocking_filter_override_flag | u(1) |
| if( slice_deblocking_filter_override_flag ) { | |
| slice_deblocking_filter_disabled_flag | u(1) |
| if( !slice_deblocking_filter_disabled_flag ) { | |

TABLE 6-continued

| | Descriptor |
|---|---|
| slice_beta_offset_div2 | sc(v) |
| slice_tc_offset_div2 | se(v) |
| } | |
| } | |
| ... | |
| } | |

Semantics of syntax elements included in the syntax of Table 6 may, for example, be indicated as shown below in Table 7.

TABLE 7

| |
|---|
| slice_deblocking_filter_override_present_flag equal to 1 specifies that slice_deblocking_filter_override_flag is present in the slice. slice_deblocking_filter_override_present_flag equal to 0 specifies that slice_deblocking_filter_override_flag is not present in the slice. When slice_deblocking_filter_override_present_flag is not present, it is inferred to be equal to 0. |
| slice_deblocking_filter_override_flag equal to 1 specifies that deblocking parameters are present in the slice. slice_deblocking_filter_override_flag equal to 0 specifies that deblocking parameters are not present in the slice. When not present, the value of slice_deblocking_filter_override_flag is inferred to be equal to 0. |
| slice_deblocking_filter_disabled_flag equal to 1 specifies that the operation of the deblocking filter is not applied for the slice. slice_deblocking_filter_disabled_flag equal to 0 specifies that the operation of the deblocking filter is applied for the slice. When slice_deblocking_filter_disabled_flag is not present, it is inferred to be equal to pps_deblocking_filter_disabled_flag. |
| slice_beta_offset_div2 and slice_tc_offset_div2 specify the deblocking parameter offsets for β and tC (divided by 2) for the slice. The values of slice_beta_offset_div2 and pic_tc_offset_div2 shall both be in the range of −6 to 6, inclusive. When not present, the values of slice_beta_offset_div2 and pic_tc_offset_div2 are inferred to be equal to pps_beta_offset_div2 and pps_tc_offset_div2, respectively. |

Referring to the tables that are presented above, when a value of deblocking_filter_sh_override_enabled_flag, which corresponds to a flag indicating whether or not the deblocking procedure is being applied at the slice level, is equal to 1, slice_deblocking_filter_override_present_flag may be signaled. When a value of slice_deblocking_filter_override_present_flag is equal to 1. the slice_deblocking_filter_override_flag, which corresponds to a flag indicating whether or not a parameter related to the deblocking procedure is present in the slice header, may be present in the slice header. Alternatively, when a value of slice_deblocking_filter_override_present_flag is equal to 0, slice_deblocking_filter_override_flag, which corresponds to a flag indicating whether or not a parameter related to the deblocking procedure is present in the slice header, may not be present in the slice header.

Additionally, when a value of the slice_deblocking_filter_override_flag, which corresponds to a flag indicating whether or not a parameter related to the deblocking procedure is present in the slice header, is equal to 1, the deblocking parameters may be present (or may exist) in the slice header. And, when a value of the slice_deblocking_filter_override_flag, which corresponds to a flag indicating whether or not a parameter related to the deblocking procedure is present in the slice header, is equal to 0, the deblocking parameters may not be present (or may not exist) in the slice header.

Additionally, when a value of slice_deblocking_filter_disabled_flag is equal to 1, a deblocking filter may not be applied for slices being related to the slice header. And, when a value of slice_deblocking_filter_disabled_flag is equal to 0, a deblocking filter may be applied for slices being related to the slice header.

Additionally, slice_beta_offset_div2 and slice_tc_offset_div2 may respectively designate deblocking parameter offset for β and tC (value divided by 2) for slices. Values of slice_beta_offset_div2 and slice_tc_offset_div2 may all be within a range of −6 to 6.

Figure 9:
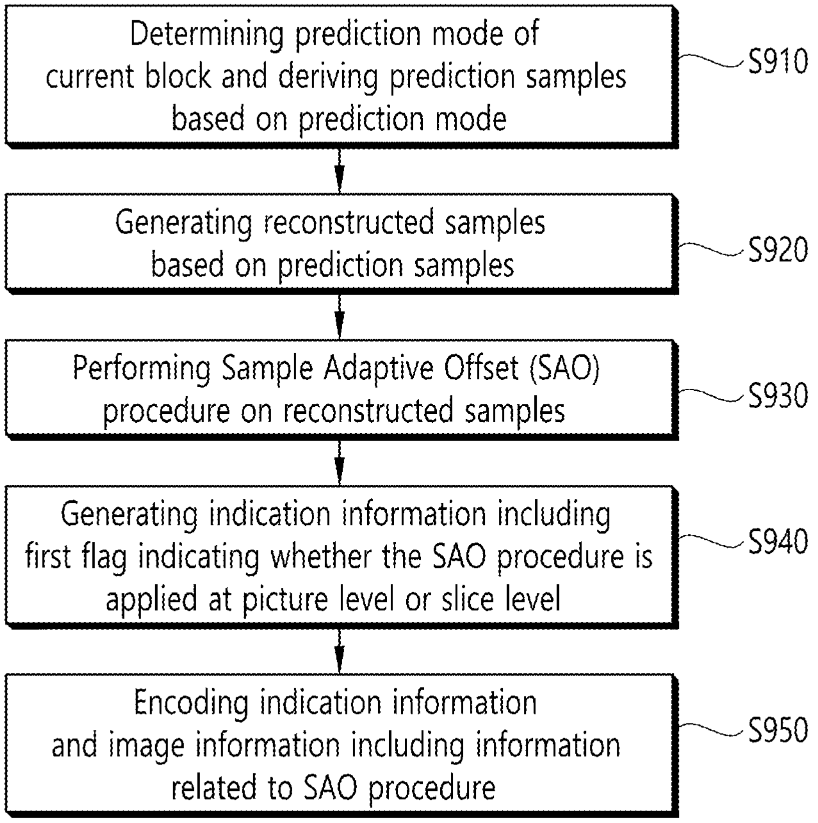
FIG. 9 is a flowchart illustrating an operation of an image encoding apparatus according to an embodiment.
Figure 10:
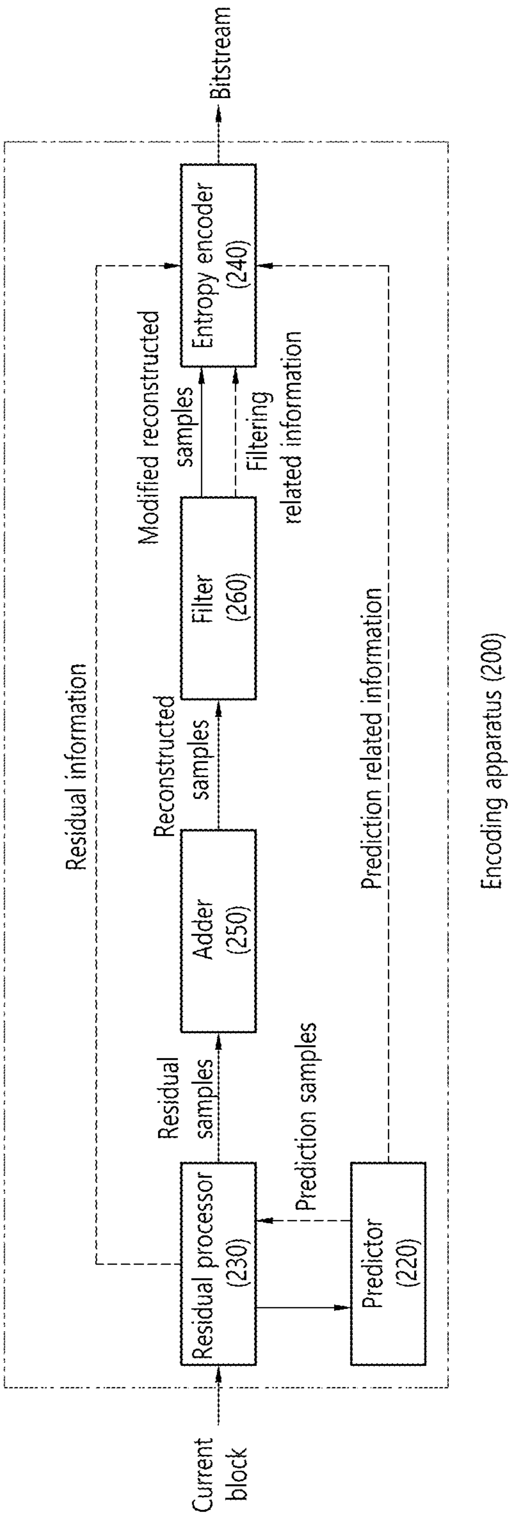
FIG. 10 is a block diagram illustrating a configuration of an image encoding apparatus according to an embodiment.

FIG. 9 is a flowchart illustrating an operation of an image encoding apparatus according to an embodiment, and FIG. 10 is a block diagram illustrating a configuration of an image encoding apparatus according to an embodiment.

The method disclosed in FIG. 9 may be performed by the encoding apparatus disclosed in FIG. 2 or FIG. 10. S910 of FIG. 9 may be performed by the predictor 220, and S920 of FIG. 9 may be performed by the adder 250 shown in FIG. 2. Additionally, S930 may be performed by the filter 260 shown in FIGS. 2, and S940 and S950 of FIG. 9 may be performed by the entropy encoder 240 shown in FIG. 2.

Furthermore, operations according to S910 to S950 are based on part of the description presented above in FIG. 1 to FIG. 8. Therefore, detailed description that overlap with the description of FIG. 1 to FIG. 8 will be omitted or briefly presented for simplicity.

Referring to FIG. 9, an encoding apparatus according to an embodiment may determine a prediction mode of a current block and may derive prediction samples based on the prediction mode (S910). For example, the encoding apparatus may determine a merge mode, an affine (merge) mode or a subblock merge mode as an inter prediction mode that is to be applied to the current block. However, the present disclosure will not be limited only to this. The encoding apparatus may derive prediction samples based on the determined inter prediction mode.

The encoding apparatus according to the embodiment may generate reconstructed samples based on the prediction samples (S920). For example, the adder 250 of the encoding apparatus may generate reconstructed samples by adding reconstructed residual samples to prediction samples outputted from the predictor 220.

The encoding apparatus according to the embodiment may perform a Sample Adaptive Offset (SAO) procedure on the reconstructed samples (S930). For example, the filter 260 of the encoding apparatus may generate modified reconstructed samples by performing an SAO procedure on the reconstructed samples.

The encoding apparatus according to the embodiment may generate indication information including a first flag indicating whether the SAO procedure is applied at a picture level or a slice level (S940). For example, the indication information may be included in one of a Sequence Parameter Set (SPS) and a Picture Parameter Set (PPS). The first flag may indicate whether the information related to the SAO procedure is present in the picture header or in the slice header. Based on a case where a value of the first flag is equal to 1, information related to the SAO procedure may be present in the picture header. And, based on a case where a value of the first flag is equal to 0, information related to the SAO procedure may be present in the slice header.

For example, the indication information may further include a second flag related to whether signaling of a reference picture list is applied at a picture level or a slice level. Based on a case where a value of the second flag is equal to 1, information related to the signaling of a reference picture list may be present in the picture header. And, based on a case where a value of the second flag is equal to 0, information related to the signaling of a reference picture list may be present in the slice header.

For example, the indication information may further include a third flag related to whether an Adaptive Loop Filter (ALF) procedure is applied at a picture level or a slice level. Based on a case where a value of the third flag is equal to 1, information related to the ALF procedure may be present in the picture header. And, based on a case where a value of the third flag is equal to 0, the information related to the ALF procedure may be present in the slice header.

For example, the indication information may further include at least one fourth flag indicating whether a deblocking procedure is applied at a picture level or a slice level. Based on a case where a value of any one of the at least one fourth flag is equal to 1, a flag indicating whether parameters related to the deblocking procedure are present in the picture header may be present in the picture header, and, based on a case where a value of any one of the at least one fourth flag is equal to 0, a flag indicating whether parameters related to the deblocking procedure are present in the picture header may not be present in the picture header.

The encoding apparatus according to the embodiment may encode the indication information and image information including the information related to the SAO procedure (S950). For example, the filter 260 of the encoding apparatus may generate the information related to the SAO procedure, the information related to the ALF procedure or the information related to the deblocking filtering procedure. Alternatively, for example, the predictor 220 of the encoding apparatus may generate information related to signaling of a reference picture list. The entropy encoder 240 of the encoding apparatus may encode indication information including a first flag, a second flag, a third flag or a fourth flag. Additionally, the entropy encoder 240 of the encoding apparatus may encode the information related to the SAO procedure, the information related to the ALF procedure, the information related to the deblocking procedure or the information related signaling of reference picture list.

Additionally, the image information may include prediction information for the current block. The prediction information may include information on an inter prediction mode or an intra prediction mode that is being performed on the current block. Additionally, the image information may include residual information that is generated from original samples by the residual processor 230 of the encoding apparatus.

Meanwhile, the bitstream having image information encoded therein may be transmitted to the decoding apparatus through a network or a (digital) storage medium. Herein, the network may include a broadcast network and/or a communication network, and so on, and the digital storage medium may include various storage media, such as USB, SD, CD, DVD, Blu-ray, HDD, SSD, and so on.

Figure 11:
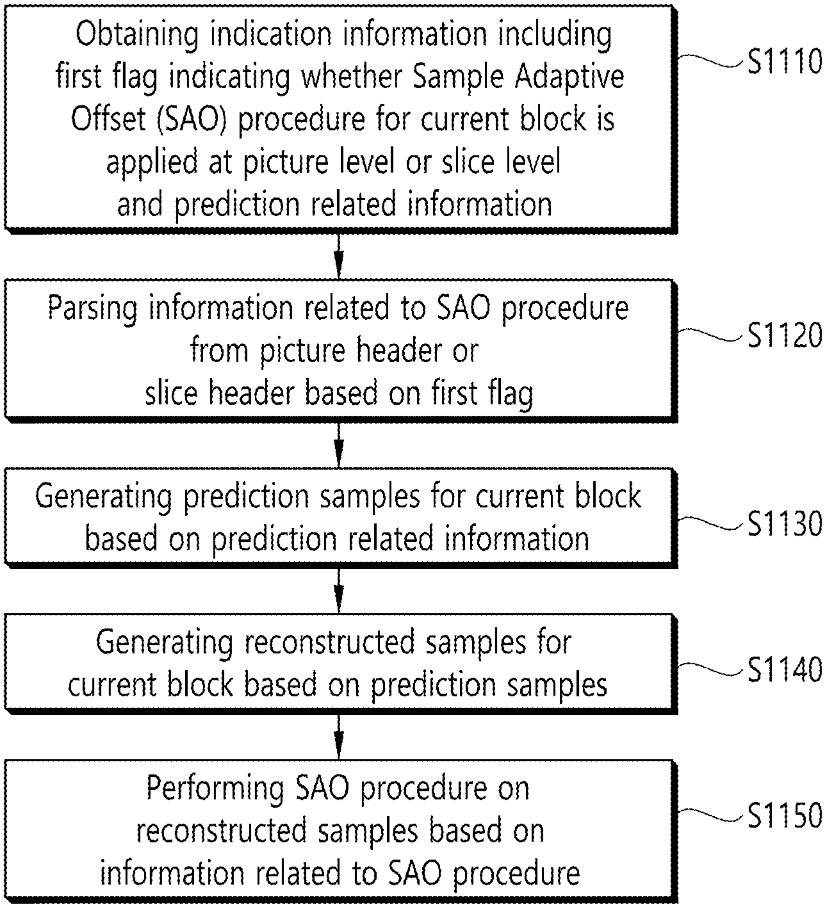
FIG. 11 is a flowchart illustrating an operation of an image decoding apparatus according to an embodiment.
Figure 12:
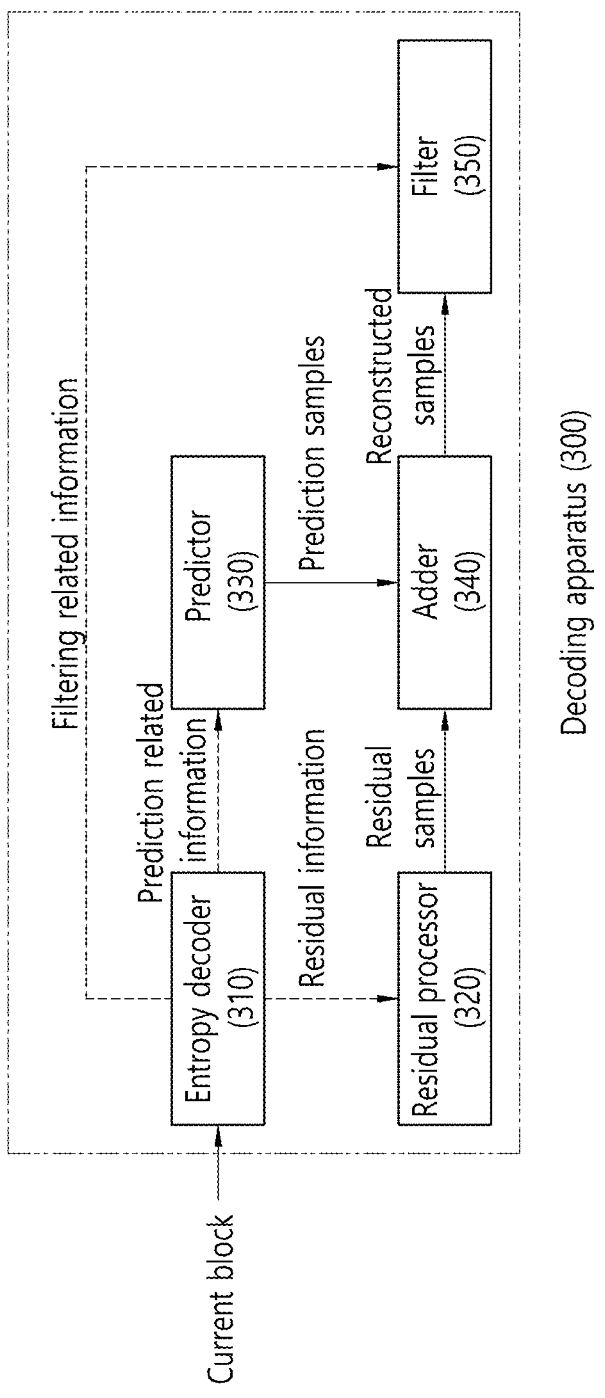
FIG. 12 is a block diagram illustrating a configuration of an image decoding apparatus according to an embodiment.

FIG. 11 is a flowchart illustrating an operation of an image decoding apparatus according to an embodiment, and FIG. 12 is a block diagram illustrating a configuration of an image decoding apparatus according to an embodiment.

The method disclosed in FIG. 11 may be performed by the decoding apparatus disclosed in FIG. 3 or FIG. 12. More specifically, S1110 and S1120 of FIG. 11 may be performed by the entropy decoder 310 shown in FIG. 3, and S1130 may be performed by the predictor 330 shown in FIG. 3. And, S1140 may be performed by the adder 340 shown in FIG. 3, and S1150 of FIG. 11 may be performed by the filter 350 shown in FIG. 3. Furthermore, operations according to S1110 to S1150 are based on part of the description presented above in FIG. 1 to FIG. 8. Therefore, detailed description that overlap with the description of FIG. 1 to FIG. 8 will be omitted or briefly presented for simplicity.

A decoding apparatus according to an embodiment may obtain indication information including a first flag indicating whether a Sample Adaptive Offset (SAO) procedure for a current block is applied at a picture level or a slice level and prediction related information (S1110). For example, the prediction related information may include inter prediction mode information, and the inter prediction mode information may include information indicating at least some of various inter prediction modes. For example, various modes, such as merge mode, skip mode, motion vector prediction (MVP) mode, Affine mode, subblock merge mode or merge with MVD (MMVD) mode, and so on, may be used.

For example, the indication information may be included in one of a Sequence Parameter Set (SPS) and a Picture Parameter Set (PPS). Alternatively, for example, the indication information may include a second flag indicating whether signaling of a reference picture list is applied at a picture level or a slice level. For example, the indication information may include a third flag indicating whether an Adaptive Loop Filter (ALF) procedure is applied at a picture level or a slice level. Alternatively for example, the indication information may include at least one fourth flag indicating whether a deblocking procedure is applied at a picture level or a slice level.

The decoding apparatus according to the embodiment may parse information related to the SAO procedure from a picture header or a slice header based on the first flag (S1120). For example, based on a case where a value of the first flag is equal to 1, the decoding apparatus may parse the information related to the SAO procedure from the picture header, and, based on a case where a value of the first flag is equal to 0, the decoding apparatus may parse the information related to the SAO procedure from the slice header.

Alternatively, the decoding apparatus may parse information related to the signaling of the reference picture list from the picture header or the slice header based on the second flag. For example, based on a case where a value of the second flag is equal to 1, the information related to the signaling of the reference picture list may be parsed from the picture header, and, based on a case where a value of the second flag is equal to 0, the information related to the signaling of the reference picture list may be parsed from the slice header.

Alternatively, the decoding apparatus may parse information related to the ALF procedure from the picture header or the slice header based on the third flag. For example, based on a case where a value of the third flag is equal to 1, the information related to the ALF procedure may be parsed from the picture header, and, based on a case where a value of the third flag is equal to 0, the information related to the ALF procedure may be parsed from the slice header.

Alternatively, the decoding apparatus may parse information related to the deblocking procedure from the picture header or the slice header based on the at least one fourth flag. For example, based on a case where a value of any one of the at least one fourth flag is equal to 1, a flag indicating whether parameters related to the deblocking procedure are present in the picture header may be present in the picture header, and, based on a case where a value of any one of the at least one fourth flag is equal to 0, a flag indicating whether parameters related to the deblocking procedure are present in the picture header may not be present in the picture header.

The decoding apparatus according to the embodiment may generate prediction samples for the current block based on the prediction related information (1130). For example, the decoding apparatus may perform inter prediction based on inter prediction mode information that is included in the prediction related information. For example, the inter prediction mode information may include information indicating at least some of various inter prediction modes. For example, various modes, such as merge mode, skip mode, motion vector prediction (MVP) mode, Affine mode, subblock merge mode or merge with MVD (MMVD) mode, and so on, may be used.

The decoding apparatus according to the embodiment may generate reconstructed samples for the current block based on the prediction samples (S1140). For example, the decoding apparatus may derive residual samples based on residual information and may generate reconstructed samples based on the prediction samples and the residual samples. A reconstructed block and reconstructed picture may be derived based on the reconstructed samples.

The decoding apparatus according to the embodiment may perform the SAO procedure on the reconstructed samples based on the information related to the SAO procedure (S1150). For example, the filter 350 of the decoding apparatus may generate modified reconstructed samples that are modified by performing the SAO procedure on the reconstructed samples.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the above-described embodiments of the present document may be implemented in software form, and the encoding apparatus and/or decoding apparatus according to the present document is, for example, may be included in the apparatus that performs the image processing of a TV, a computer, a smart phone, a set-top box, a display device, and so on.

When the embodiments in the present document are implemented in software, the above-described method may be implemented as a module (process, function, and so on) that performs the above-described function. A module may be stored in a memory and executed by a processor. The memory may be internal or external to the processor, and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present document may be implemented and performed on a processor, a microprocessor, a controller, or a chip. For example, the functional parts shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (i.e., vehicle user equipment, an airplane user equipment, a ship user equipment, and so on) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present document is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present document may be implemented with a computer program product according to program codes, and the program codes may be performed in a computer by the embodiments of the present document. The program codes may be stored on a carrier which is readable by a computer.

Figure 13:
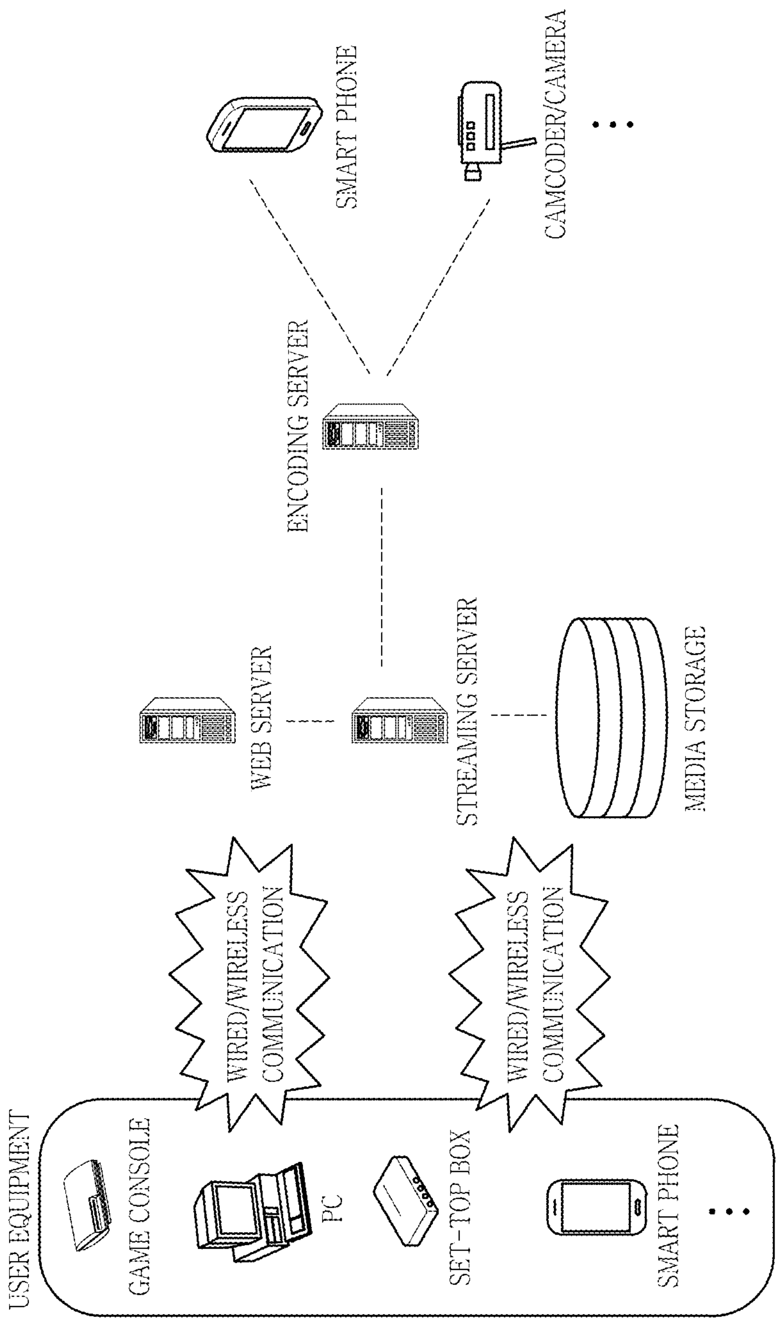
FIG. 13 illustrates an exemplary structure of a content streaming system to which the present disclosure is applicable.

FIG. 13 shows an example of a content streaming system to which embodiments disclosed in the present document may be applied.

Referring to FIG. 13, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, and so on. Into digital data to generate a bitstream and transmit the bitstream to the streaming server. As another example, when the multimedia input devices such as smartphones, cameras, camcorders, and so on, directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., Smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributed and processed.

The claims described herein may be combined in various ways. For example, the technical features of the method claims of the present document may be combined and implemented as an apparatus, and the technical features of the apparatus claims of the present document may be combined and implemented as a method. In addition, the technical features of the method claim of the present document and the technical features of the apparatus claim may be combined to be implemented as an apparatus, and the technical features of the method claim of the present document and the technical features of the apparatus claim may be combined and implemented as a method.

What is claimed is:

1. A decoding apparatus for an image decoding, the decoding apparatus comprising:

a memory; and at least one processor connected to the memory, the at least one processor configured to:

obtain Sample Adaptive Offset (SAO) related flag information indicating whether a SAO procedure for a current block is applied at a picture level or a slice level and prediction related information;

determine from which header among a picture header or a slice header SAO information for the SAO procedure is parsed based on the SAO related flag information;

parse the SAO information for the SAO procedure from the picture header or the slice header based on the determination; and decode a current block based on the SAO related flag information and the prediction related information, wherein the current block is decoded based on:

deriving a prediction mode based on the prediction related information, generating prediction samples for the current block based on the prediction mode, generating reconstructed samples for the current block based on the prediction samples, and performing the SAO procedure on the reconstructed samples based on the SAO information for the SAO procedure, and wherein the SAO related flag information is obtained from a Picture Parameter Set (PPS).

2. An encoding apparatus for an image encoding, the encoding apparatus comprising:

a memory; and at least one processor connected to the memory, the at least one processor configured to:

derive a prediction mode of a current block;

derive prediction samples based on the prediction mode;

generate reconstructed samples based on the prediction samples;

perform a Sample Adaptive Offset (SAO) procedure on the reconstructed samples;

generate SAO information for the SAO procedure;

generate SAO related flag information indicating whether the SAO procedure is applied at a picture level or a slice level; and encode image information including the SAO related flag information and prediction related information, wherein the SAO related flag information represents in which header among a picture header or a slice header the SAO information is present, and wherein the SAO related flag information is included in a Picture Parameter Set (PPS).

3. An apparatus for transmitting data for an image, the apparatus comprising:

at least one processor configured to obtain a bitstream for the image, wherein the bitstream is generated based on deriving a prediction mode of a current block, deriving prediction samples based on the prediction mode, generating reconstructed samples based on the prediction samples, performing a Sample Adaptive Offset (SAO) procedure on the reconstructed samples, generating SAO information for the SAO procedure, generating SAO related flag information indicating whether the SAO procedure is applied at a picture level or a slice level, and encoding image information including the SAO related flag information and prediction related information to output the bitstream; and a transmitter configured to transmit the data comprising the bitstream, wherein the SAO related flag information represents in which header among a picture header or a slice header the SAO information is present, and wherein the SAO related flag information is included in a Picture Parameter Set (PPS).

* * * * *